Oct. 9, 1945.  H. KOTT  2,386,320
EXPOSURE METER
Filed March 24, 1943
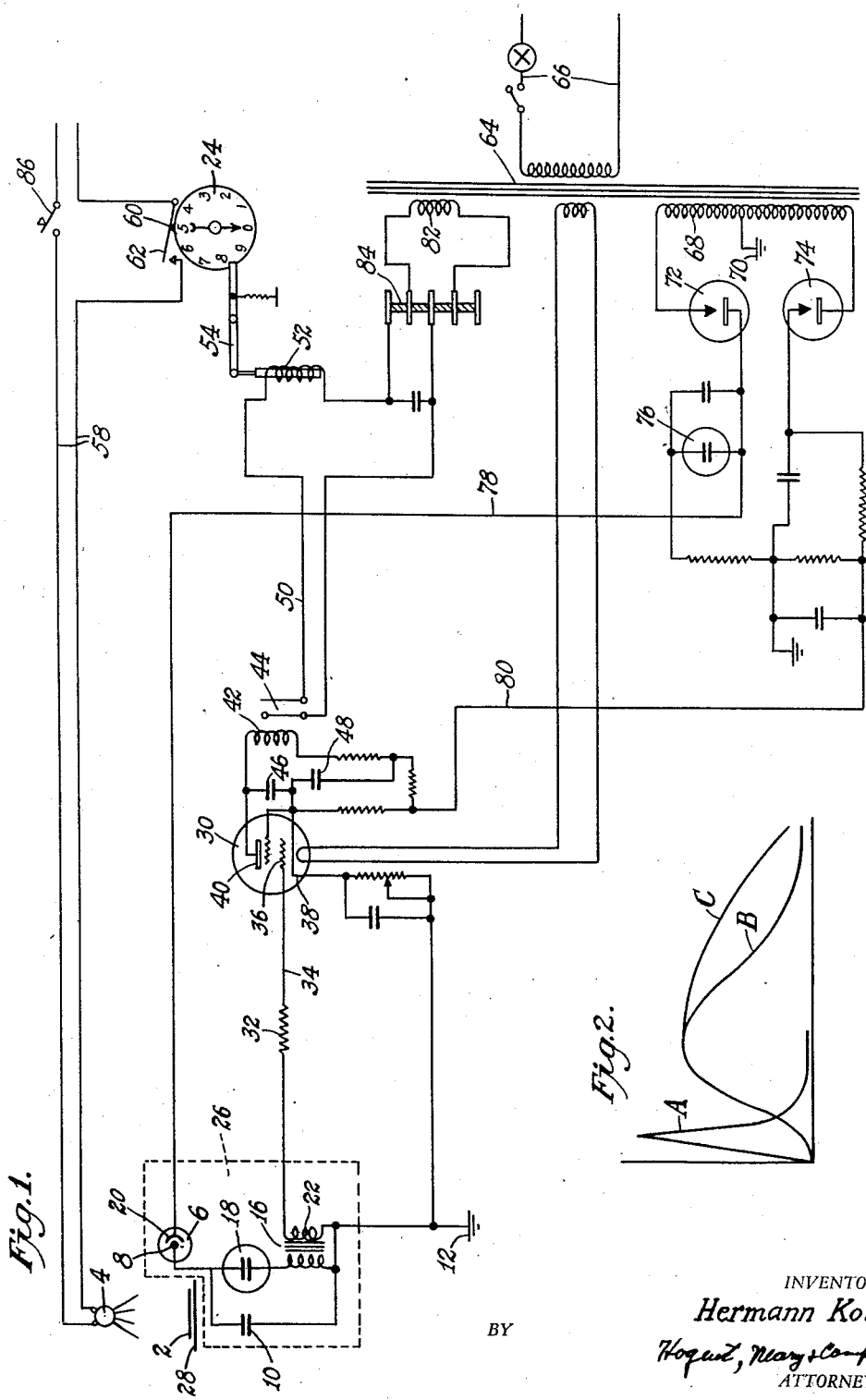
INVENTOR
Hermann Kott
ATTORNEY Patented Oct. 9, 1945

2,386,320

UNITED STATES PATENT OFFICE 2,386,320

EXPOSURE METER

Hermann Kott, West Orange, N. J., assignor to Alco-Gravure Division of Publication Corporation, New York, N. Y., a corporation of New York Application March 24, 1943, Serial No. 480,280

2 Claims. (Cl. 250—41.5)

This invention relates to exposure meters and particularly to constructions whereby the length of time of an exposure is varied in response to variations in the intensity of the light with which an object is illuminated.

It is frequently difficult to obtain uniformity in exposure or the desired degree of exposure of photo-sensitive objects, particularly when the light source varies in intensity. Under such conditions either under-exposed or over-exposed films or prints may be obtained and lack of uniformity results even with the same duration of exposure.

In accordance with the present invention, these objections are overcome by integrating the amount of light falling on an object over a period of time and using such integrated radiations to vary the period of exposure. With this construction, if the intensity of the light on the object is increased the period of exposure is shortened whereas if the light intensity is decreased, the period of exposure is correspondingly increased.

The integrating means employed preferably includes a photoelectric cell or other radiation responsive means receiving light from the light source or from the object being exposed. A condenser is connected to the photoelectric cell whereby the emission from the cell is accumulated at a rate which is directly proportional to the intensity of the radiation. Voltage responsive means are connected in parallel with the condenser to discharge the condenser when it has accumulated a predetermined charge and are utilized for controlling operation of a counter or timing device. The frequency of operation of the counter or the manner of operation of the timing device therefore is determined by the intensity of the light or radiation received by the photoelectric cell and is used to vary the duration of the exposure. The preferred embodiment of the invention further includes means for stabilizing operation of the photoelectric cell and its circuits to eliminate extraneous influences which might alter or impair the operation of the system.

One of the principal objects of the invention is to provide novel exposure meters including light integrating means for controlling the operation thereof.

Another object of the invention is to provide an exposure meter including a photoelectric cell with a condenser and means actuated when a predetermined charge has accumulated on the condenser.

A particular object of the invention is to provide an exposure meter with a timer and means controlling operation of the timer including integrating means receiving light from a light source or the object to be exposed.

These and other objects and features of the invention will be apparent from the following description thereof in which reference is made to the figure of the accompanying drawing.

In the drawing:

Figure 1 is a wiring diagram and diagrammatic illustration of a typical system and combination of elements embodying the present invention, and Figure 2 is a diagrammatic representation of the current flow at different points in the circuit of Figure 1.

In the embodiment of the invention illustrated, the object to be exposed is shown at 2 and is illuminated by a light source 4. A photoelectric cell 6 is positioned to receive light from the source 4 and is provided with an anode 8 connected to a condenser 10. The opposite side of the condenser is connected to the ground at 12 and to the primary winding 14 of an audio frequency transformer 16. The anode 8 is connected to the opposite end of the primary winding 14 through voltage responsive means 18 constructed or adjusted to break down and permit the flow of current therethrough when a predetermined difference in potential has been built up on the opposite sides of the condenser 10. The voltage responsive means used are preferably in the form of a neon lamp or similar gas filled tube with activated electrodes which break down the gas at about 72 volts.

The light from the source 4 falling on the photoelectric cell thus causes electrons to be emitted from the cathode 20 of the photoelectric cell and to build up a charge on the condenser 10 until the potential difference at the opposite sides of the neon tube 18 equals about 72 volts. Current will then flow through the tube 18 and through the primary windings of the transformer 16 to impress a voltage on the secondary windings 22 of the transformer for controlling the operation of a counter or timing device 24 which is connected to the light source 4. The counter is adjusted to extinguish the light 4 after a predetermined number of movements and may be set as desired for any exposure, or it may be otherwise constructed or connected to control the light source.

The emission of electrons from the cathode of the photoelectric cell is directly proportional to the intensity of the light falling thereon and therefore the length of time required for the requisite voltage to build up on the condenser 10 is directly proportional to the light intensity during that period of time. The photoelectric cell, condenser 10 and voltage responsive tube 18 thus cooperate with the transformer 16 to serve as an integrating device which gives a measure of light intensity and the number of impulses in the circuit including the secondary winding of the transformer is a measure of the total radiation received by the photoelectric cell. In order to insure stability of operation at all times and under varying conditions of humidity and electrical disturbance the elements which make up the integrator preferably are housed in a sealed container indicated at 26 and located on the copy board 28 of the camera.

The surge of current resulting from discharge of the condenser 10 through tube 18 and the primary 14 of the transformer produces a corresponding surge of current in the secondary 22 of the transformer. However, this surge of current in the primary is only of momentary duration, in the neighborhood of $10^{-6}$ seconds as represented by the curve A in Figure 2. The induced surge of current in the secondary of the transformer is more prolonged due to the use of an audio frequency transformer of high resistance and inductance and as a result the flow of current from the secondary 22 may be represented by the curve B of Figure 2. Even this flow of current is of relatively short duration and may be insufficient to insure operation of the gas filled tube 30 to which the secondary of the transformer 16 is connected. For this reason a resistance 32 in the neighborhood of 100,000 ohms is inserted in the line 34 between the secondary 22 of the transformer 16 and the grid 36 of the gas filled tube 30. The potential imposed on the grid 36 by the integrator circuit is thus prolonged as represented by the curve C in Figure 2 and is sufficient to render the tube 30 operative.

The tube 30 is a rectifier operated on direct current voltage and when once energized a continuous flow of current will pass from the cathode 38 of the tube to the anode 40 and thence through the windings 42 of the relay 44 until suppressed by the condensers 46 and 48. Thus an actuating circuit is provided by which relay 44 is caused to close the control circuit 50 which includes the windings 52 of a solenoid operated trip 54 to advance the counter 24 one step. The counter in turn is connected to the light source 4 by the conductors 58 of a lighting circuit and after being advanced a predetermined number of steps, for which it is previously set, the circuit 58 including the light source is broken by the projection 60 engaging the switch 62.

With this construction each discharge of the neon tube 18 corresponds to a predetermined integrated radiation by the light source, and serves to cause the counter to be advanced one step from its previous setting toward the zero position in which it serves to break the circuit including the light source. The mechanism therefore insures exposure of the object to the same total illumination or radiation irrespective of the intensity thereof. The exposure is thereby controlled accurately so that any selected degree of exposure may be obtained and certainty or uniformity of results assured.

In order to stabilize the system and eliminate the influence of stray light or "dark impulses" on the photoelectric cell, a negative potential is imposed on the cathode 20 of the photoelectric cell. For this purpose the transformer 64 receiving current from a power line 66 is provided with secondary windings 68 grounded at their midpoint 70 and connected to rectifier tubes 72 and 74. A voltage regulator 76 is connected in the circuit to insure uniformity in the voltage from the rectifier. The negative side of the rectifier is then connected by the conductor 78 to the cathode 20 of the photoelectric cell. The resistance of the photoelectric cell is very high and since it has substantially no leakage the application of a negative potential to the cathode serves to eliminate the influence of "dark impulses" or stray light effects which might produce an undesired discharge if the cathode were connected directly to ground.

The plate 40 of the grid controlled rectifier tube 30 is supplied with a positive voltage from the rectifier tubes 72 and 74 through the conductor 80 whereas current for actuating the trip mechanism 54 of the counter is supplied from secondary windings 82 of the transformer 64 through the dry rectifier 84 and relay 44.

The operation of the system is as follows: The object 2 to be exposed is placed beneath the light source 4 on the copy board of the camera. The counter 24 is turned to the desired exposure indication, say "5," to control the number of impulses or light increments to which the object is to be exposed. The switch 62 is thus closed while the circuit including the light source is kept open by the starting switch 86. Thereafter on closing switch 86 the light source 4 is illuminated and light falls not only on the object 4 but also on the photoelectric cell 6. The electrons emitted by the cathode 20 and received by anode 8 of the cell build up a charge on the condenser 10. When the charge so accumulated reaches a potential of 72 volts, or the break down voltage of neon tube 18, a surge of current flows through the primary 14 of audio-frequency transformer 16. This current induces a relatively prolonged flow of current in the secondary 22 of the transformer and the flow is further prolonged by the high resistance 32 in the line 34 connected to the grid 36 of the gas filled tube 30.

The potential applied to the grid 36 serves to cause direct current to flow through the windings 42 of relay 44 to close the counter circuit 50. However, the tube current is discontinued after a moment's flow by the action of condensers 46 and 48 so that the counter actuating circuit is again broken and the system prepared for the next succeeding light integrating impulse.

During the period when the counter actuating circuit is closed, current from the windings 82 of transformer 64 passes rectifier 84 and energizes the solenoid 52 of the trip mechanism 54 to advance the counter one step from its original setting toward its zero, or light extinguishing position.

These operations are repeated each time a predetermined amount of light has fallen on the object and photoelectric cell and each time the charge on condenser 10 has built up to the point where the neon tube 18 will break down. If the counter was originally set at "5" for example, the fifth impulse will serve to move the projection 60 on the timer 24 into position to actuate switch 62 and break the circuit including the light source 4. The light will thus be extinguished as soon as the proper exposure of the object has been achieved and even though the total length of time of the exposure may vary because of lack of uniformity of illumination the total illumination and therefore the exposure of the object may be maintained uniform.

While one particular embodiment of the invention has been shown in the drawing and described above to indicate the nature of the invention, it should be understood that numerous changes may be made in the construction of the various elements of the combination and in the arrangement and operation thereof without departing from the spirit and scope of the invention as defined by the claims.

I claim:

1. An integrating device for controlling the operation of a light source comprising a photoelectric cell having an anode and a cathode, means for supplying electrical energy to said cell, a high inductance and resistance transformer having primary and secondary windings, a condenser, means electrically connecting said anode to one side of said condenser and one end of said primary winding to the opposite side of said condenser to charge said condenser in response to light falling on said tube from said light source, means connecting the opposite end of said primary winding to said anode through said glow discharge tube whereby said condenser discharges through said tube and said primary winding when a predetermined potential has been built up across said condenser, a grid control rectifier tube, means including a high value resistance connecting the grid of said rectifier tube to said secondary winding, and timing switch means responsive to impulses from said rectifier tube produced by discharge from said condenser for deenergizing said light source.

2. An integrating device for controlling the operation of a light source comprising a photoelectric cell having an anode and a cathode, means for supplying electrical energy to said cell, a high inductance and resistance transformer having primary and secondary windings, a condenser, means electrically connecting said anode to one side of said condenser and one end of said primary winding to the opposite side of said condenser to charge said condenser in response to light falling on said tube from said light source, means connecting the opposite end of said primary winding to said anode through said glow discharge tube whereby said condenser discharges through said tube and said primary winding when a predetermined potential has been built up across said condenser, a grid control rectifier tube, means including a high value resistance connecting the grid of said rectifier tube to said secondary winding, a relay electrically connected to said rectifier tube and responsive to the discharge of said condenser through said glow discharge tube and primary winding, and timing switch means actuated by said relay for deenergizing said light source.

HERMANN KOTT.